(12) United States Patent
Jones

(10) Patent No.: US 11,687,276 B2
(45) Date of Patent: Jun. 27, 2023

(54) DATA STREAMING FOR COMPUTATIONAL STORAGE

(71) Applicant: Seagate Technology LLC, Freemont, CA (US)

(72) Inventor: Marc Timothy Jones, Firestone, CO (US)

(73) Assignee: Seagate Technology LLC, Fremont, CA (US)

(*) Notice: Subject to any disclaimer, the term of this patent is extended or adjusted under 35 U.S.C. 154(b) by 229 days.

(21) Appl. No.: 17/158,187

(22) Filed: Jan. 26, 2021

(65) Prior Publication Data
US 2022/0236911 A1 Jul. 28, 2022

(51) Int. Cl.
G06F 3/06 (2006.01)
G06F 16/2455 (2019.01)

(52) U.S. Cl.
CPC .......... *G06F 3/0656* (2013.01); *G06F 3/0617* (2013.01); *G06F 3/0659* (2013.01); *G06F 3/0679* (2013.01); *G06F 16/24568* (2019.01)

(58) Field of Classification Search
None
See application file for complete search history.

(56) References Cited

U.S. PATENT DOCUMENTS 9,141,670 B2 9/2015 Branscome et al.
2008/0244152 A1 10/2008 Chai et al.
2018/0091447 A1* 3/2018 Jared ............... H04L 47/58
2020/0125573 A1 4/2020 Zhang et al.
2020/0201692 A1 6/2020 Kachare et al.
2020/0301898 A1 9/2020 Samynathan et al.
2020/0310694 A1 10/2020 Gao et al.

OTHER PUBLICATIONS

Gu, et al.; Article entitled: "Biscuit: A Framework for Near-Data Processing of Big Data Workloads", 2016 ACM/IEEE 43rd Annual International Symposium on Computer Architecture, 13 pgs.

* cited by examiner

*Primary Examiner* — Scott C Sun
(74) *Attorney, Agent, or Firm* — Taylor English Duma LLP

(57) ABSTRACT

Methods, apparatuses, and computer-readable media for streaming arbitrarily large amounts of data through computational storage programs of a computational storage device. A computational storage device comprises a storage media, a computational storage processor, and a controller. A firmware of the controller comprises a plurality of streaming drivers, each associated with a data source or data destination of the storage device. The firmware further comprises a buffer abstraction layer operable to read data from a data source through an associated ingress streaming driver of the plurality of streaming drivers to provide a source data stream for a computational storage program executing on the computational storage processor. The buffer abstraction layer is further operable to receive a destination data stream from the computational storage program and write data to a data destination through an associated egress streaming driver of the plurality of streaming drivers.

16 Claims, 4 Drawing Sheets

DATA STREAMING FOR COMPUTATIONAL STORAGE

BRIEF SUMMARY

The present disclosure relates to technologies for streaming large amounts of data through computational storage programs. According to some embodiments, a storage device comprises a storage media, a computational storage processor, and a controller. A firmware of the controller comprises a plurality of streaming drivers, each associated with a data source or data destination of the storage device. The firmware further comprises a buffer abstraction layer operable to read data from a data source through an associated ingress streaming driver of the plurality of streaming drivers to provide a source data stream for a computational storage program executing on the computational storage processor. The buffer abstraction layer is further operable to receive a destination data stream from the computational storage program and write data to a data destination through an associated egress streaming driver of the plurality of streaming drivers.

According to further embodiments, a method for streaming large amounts of data through computational storage programs comprises steps of receiving a definition of a data source, a data destination, and a computational storage program associated with a computational storage operation in a storage device. An ingress streaming driver implemented in the storage device is provisioned for the data source, and an egress streaming driver implemented in the storage device is provisioned for the data destination. The computational storage program is executed in the storage device while reading input data from the ingress streaming driver and writing output data to the egress streaming driver through a buffer abstraction layer.

According to further embodiments, a non-transitory computer readable medium comprises processor-executable instructions that, when executed by a controller of a storage device, cause the controller to provision an ingress streaming driver for a data source associated with a computational storage operation and provision an egress streaming driver for a data destination associated with the computational storage operation. The controller then executes a computational storage program on a computational storage processor of the storage device while reading input data from the ingress streaming driver and writing output data to the egress streaming driver through a buffer abstraction layer.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for streaming large amounts of data through computational storage programs. In data-intensive computing applications, the movement of data between storage devices and host compute resources presents a performance bottleneck. Computational storage comprises technologies and storage architectures that shift data compute tasks to processing resources closer to the storage media, offloading processing from host CPUs and reducing the storage-to-CPU bottleneck. For example, a computational storage device ("CSD") may comprise a conventional storage device, such as an HDD or an SSD, with dedicated processing hardware added to perform operations directly on data stored therein. Computational storage devices and architectures lend themselves to high volume, data-intensive operations such as compression/decompression, encryption, video transcoding, and other algorithmic operations for edge computing, machine learning, real-time data analytics, and HPC applications.

Figure 1:
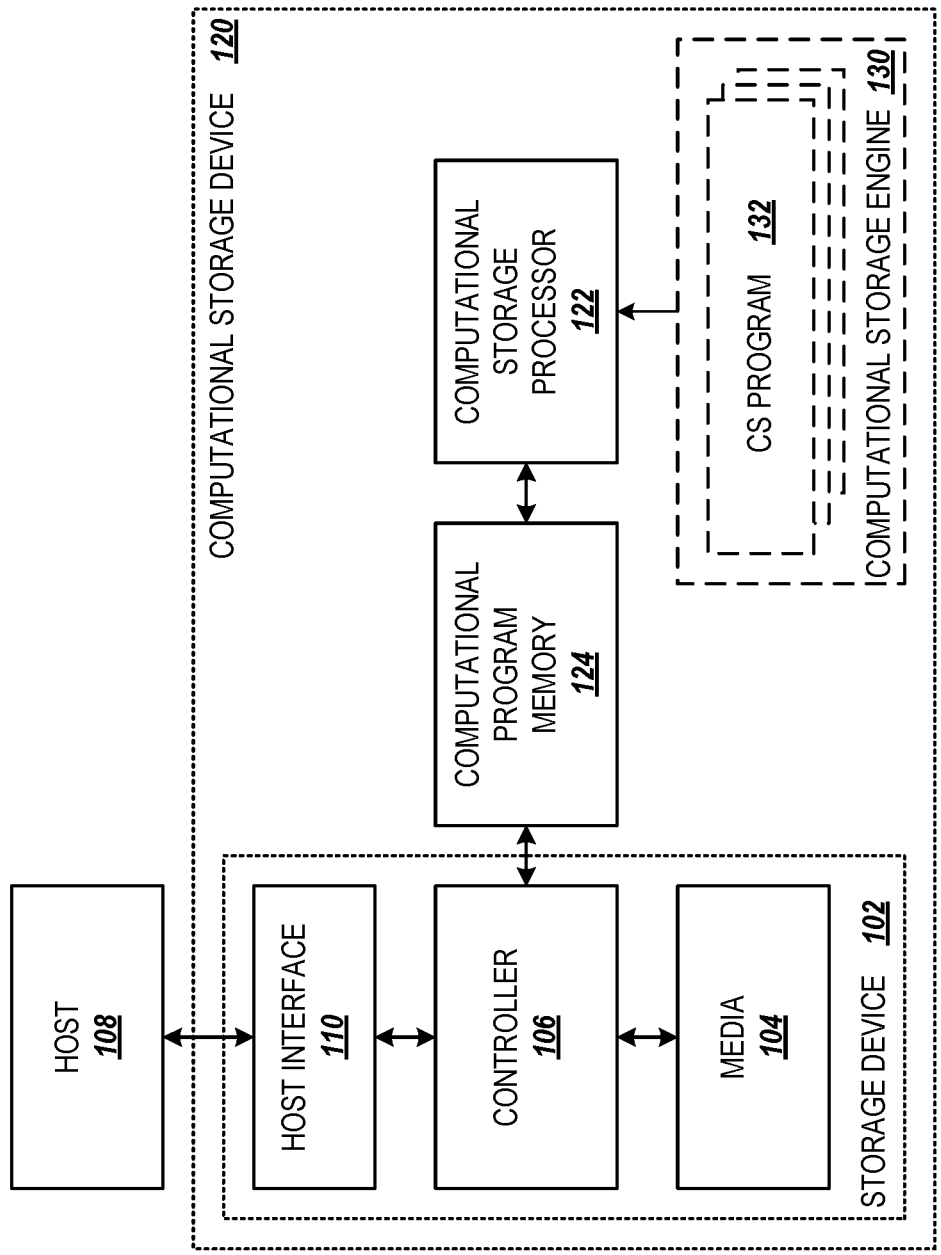
FIG. 1 is a block diagram showing components of a conventional storage device along with a computational storage device in which the embodiments described herein may be implemented.

FIG. 1 shows the components of a typical storage device 102. The storage device 102 includes non-volatile storage media 104, such as NAND FLASH memory, NOR flash memory, other FLASH technology memories, phase-change memory ("PCM"), racetrack memory, magnetic media, optical media, and/or the like. The storage device further includes a controller 106 than manages data stored on the storage media 104 and processes data read and write requests from a host computing device, referred to herein generally as host 108. The host 108 may include a server computer, storage-area controller, personal computer, laptop, game console, and the like. The storage device 102 may further include a non-transitory computer-readable memory embedded in or accessible by the controller 106 and containing a firmware (not shown) comprising processor-executable code allowing the controller to process storage requests from the host 108 and perform other necessary management of the storage media 104.

The host 108 is connected to the storage device 102 through a host interface 110. According to some embodiments, the host interface 110 may be compatible with the NVM Express ("NVMe") interface for the high-bandwidth connection of the storage device 102 to the host 108 over a PCI Express ("PCIe") bus. Alternatively or additionally, the host interface 110 may be compatible with one or more of a SATA interface standard, an IDE interface standard, a SCSI interface standard, a SAS interface standard, a USB interface standard, a CF interface standard, an MMC interface standard, an SD interface standard, and the like. In further embodiments, the storage device 102 may be connected to the host(s) 108 through the host interface 110 via a switch/fabric/intermediate controller (not shown) or some other intermediate device.

According to embodiments, an illustrative computational storage device 120 may include dedicated processing resources added to the storage device 102, such as a computational storage processor ("CSP") 122 and a connected computational program memory ("CPM") 124, as further shown in FIG. 1. In some embodiments, the CSP 122 may comprise one or more processing resources, such as FPGAs, ASICs, and/or CPU cores with a limited instruction set to enable efficient algorithmic processing of raw data in the CSD 120. The CPM 124 may comprise static random access memory ("SRAM") or dynamic random access memory ("DRAM") onboard the storage device 102. In some embodiments, the computational storage device 120 may include a standardized interface and/or runtime environment, referred to herein as a CS engine 130, for execution of programs or modules, referred to generally as CS programs 132. The CS engine 130 may define an execution model and an interface for the CS programs 132 to perform computational storage operations in the CSD 120. In some embodiments, the CS engine 130 may be implemented in the firmware of the CSD 120.

For example, the enhanced Berkeley Packet Filter ("eBPF") specification may be implemented by the CS engine 130 and used to write programs that can be applied to data in the storage device 102. The eBPF specification defines an instruction set and a program structure for programs intended to run at a kernel layer in an OS and have direct access to data packets, e.g., network, storage, and the like, to process or pre-process data before passing it up to the application layer. Because of its design, the eBPF specification lends itself to being an excellent development environment for CS programs 132. Accordingly, an engineer may be allowed to write a program on a host in C, Python, or any other applicable language, and cross-compile that program into an eBPF image. The eBPF image may then be uploaded to the CSD 120 for execution on the CSP 122 to perform the desired operation(s) on data contained within the device. This provides the advantage of data no longer needing to be read onto the host 108 for processing since the data can be processed directly in the CSD 120.

One approach for implementing CS programs 132 in a CSD 120 may include designating the CPM 124 to serve as both the source and target for computational storage operations on the device. For example, the storage controller 106 may read data from the storage media 104 into the CPM 124. CS programs 132 executing on the CSP 122 may access the data in the CPM 124, processes it, and write the resulting processed data back to the CPM. The processed data may then be written by the controller 106 back to the storage media 104, sent to the host 108 through the host interface 110, and/or the like. It will be appreciated that, traditionally, storage devices 102 have minimal SRAM/DRAM available for use as CPM 124 as compared to host systems, which often have large memory capacities. This is primarily due to costs involved in implementing the additional SRAM/DRAM and supporting circuitry. Because the data is read into and processed in the limited CPM 124, this approach creates a bottleneck in the size of data that can be processed by the CS programs 132.

According to embodiments described herein, a data streaming environment may be implemented in a computational storage device that allows arbitrarily large amounts of data to be processed by computational storage programs without being restricted by the size of onboard computational program memory. In some embodiments, a data streaming environment 200 includes an abstraction layer, such as the buffer abstraction layer 202 shown in FIG. 2, implemented between the CS program 132 and a data source 204 and data destination 206 defined by the desired operation. The buffer abstraction layer 202 interfaces with the data source 204 and data destination 206 using streaming drivers, such as the ingress streaming driver 208 and egress streaming driver 210 further shown in FIG. 2, to stream data from and to a variety of sources and destinations.

Figure 2:
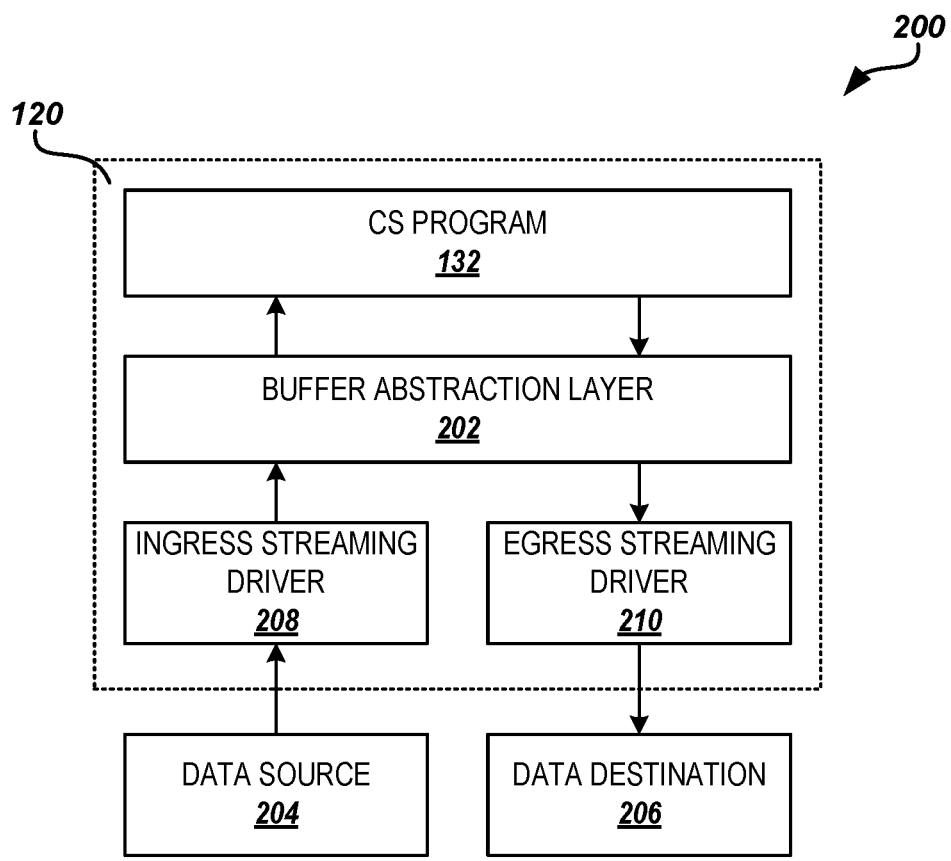
FIG. 2 is a block diagram showing a computational storage architecture for streaming data to and from computational storage programs including a buffer abstraction layer and ingress and egress streaming drivers, according to embodiments described herein.

By utilizing the data streaming environment 200 shown in FIG. 2 and described herein, only a portion of data is required to be stored in the CPM 124 at a time. This allows the CS program 132 to read data from the data source, e.g., the storage media 104, as it is needed and write data to the data destination, e.g., the host 108, as it is available without having to be concerned with (or containing code for) buffering data in the CPM 124 or being limited in processing by the amount of CPM available. The buffer abstraction layer 202, ingress streaming driver 208, and egress streaming driver 210 handle all of the reading of data from the data source 204 and writing of the resulting processed data to the data destination 206 as well as any data buffering and memory management of the CPM 124. By implementing the data streaming environment 200, the buffer abstraction layer 202 can create data pipelines to keep packet-oriented CS programs 132, such as eBPF programs, fed with data without the program requiring knowledge of the underlying data transfers while minimizing use of the CPM 124. The data streaming environment 200 may further abstract the CS programs 132 away from the data that they consume and produce.

Figure 3:
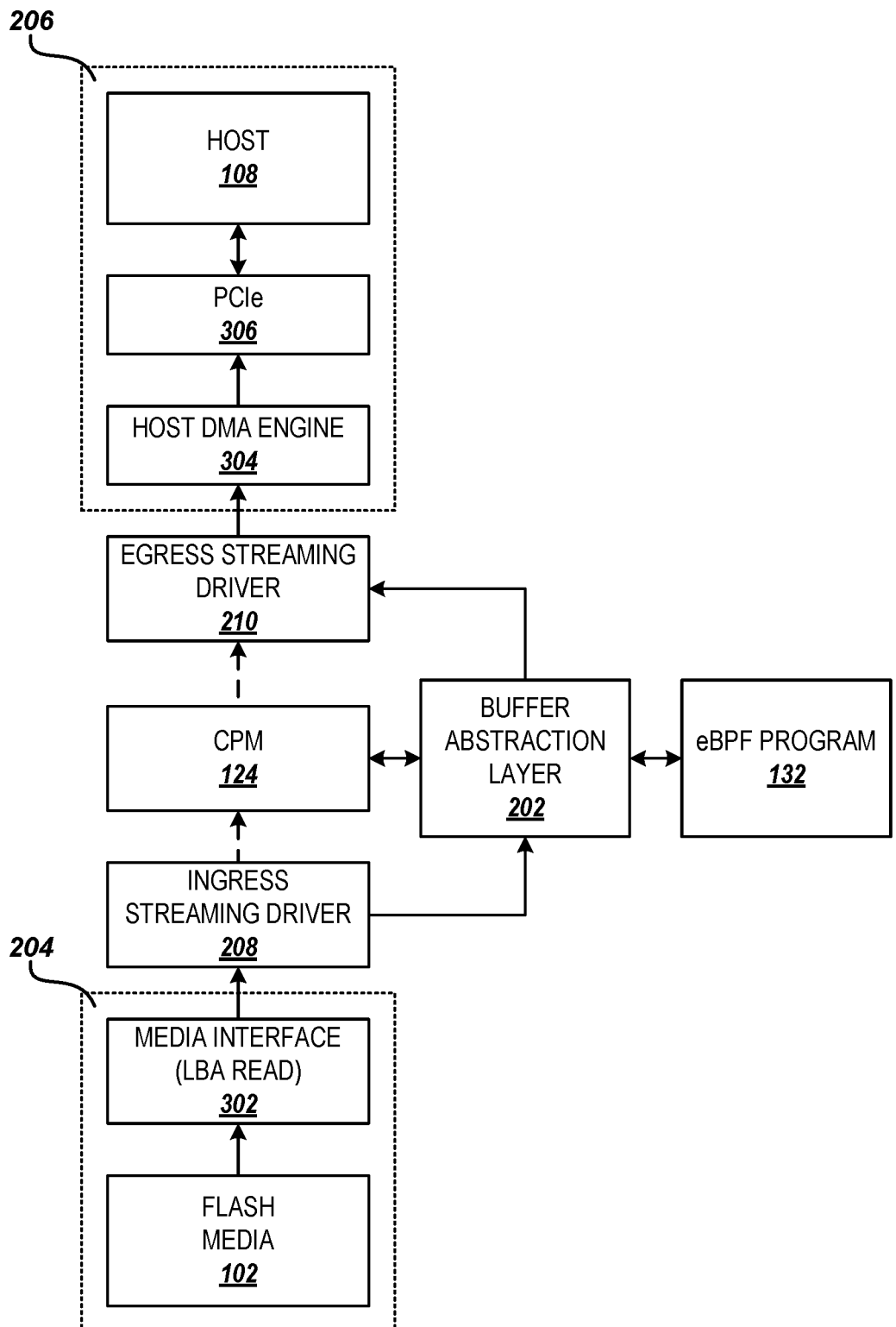
FIG. 3 is a block diagram showing one example of the computational storage architecture implemented in a computational storage device, according to some embodiments.

FIG. 3 shows one example configuration of the data streaming environment 200 in an NVMe SSD supporting computational storage processing, according to some embodiments. The configuration includes a CS program 132 executing on the CSP 122 for processing data read from the storage media 104 of the drive before it is passed to the host 108. For example, an eBPF program 132 may be present in the firmware of the CSD 120 for performing decryption and/or decompression of data as it is read from the FLASH media 104. In another example, the host 108 may upload an eBPF program 132 to the CSD 120 for transcoding video files from the format in which they stored on the FLASH media 104 to a different format suitable for playback on or streaming from the host 108.

According to some embodiments, a given computational storage operation may be associated with a data definition that specifies a data source 204, a CS program 132 that operates on input data from the data source, and a data destination 210 for the output data produced by the program. The specification of the data source 204 may include both the source of the input data, e.g., media, memory, host, etc., as well as the locations or extent of input data to be processed from the source in the computational storage operation. The CSD 120 may include a set of ingress and egress streaming drivers 208, 210 that can be attached to different data sources and destinations 204, 206 in the drive. The streaming drivers 208, 210 manage the physical input and output of data from their associated physical sources and destinations and expose read and write operations to the buffer abstraction layer 202. In some embodiments, the streaming drivers 208, 210 may expose memory operations for devices that may not be memory (such as media operations). The streaming drivers 208, 210 may be implemented in the firmware of the CSD 120, or they may be implemented in the hardware of the drive, with associated interfaces implemented within the buffer abstraction layer 202.

The buffer abstraction layer 202 provides the data pipelines to the CS program 132 for the consumption and production of data, i.e., consuming of input data from the storage media 104 and production of output data to the host. The buffer abstraction layer 202 provisions the appropriate ingress and egress streaming drivers 208, 210 for the data source 204 and data destination 206 required by the CS program 132 based on the data definition associated with the computational storage operation. In the current example, this may include an ingress streaming driver 208 for reading from the media interface of the storage media 104 (e.g., an LBA read interface 302 for the FLASH) and an egress streaming driver 210 for writing directly to host memory (e.g., a host DMA engine 304 for transfer of data over the PCIe bus 306). In some embodiments, the provisioning of the ingress and egress streaming drivers 208, 210 may be the result of API calls by the CS program 132 to the buffer abstraction layer.

The buffer abstraction layer 202 may then manage the reading of data in the ingress streaming driver 208 and the writing of data in the egress streaming driver 210 according to the consumption and production of data by the eBPF program 132. In other words, when data is consumed by the eBPF program 132, the buffer abstraction layer 208 notifies the ingress streaming driver 208 to read more data from the FLASH media 104. Conversely, when data is produced by the eBPF program 132, the buffer abstraction layer 202 notifies the egress streaming driver 210 to transfer the data to the host memory using DMA. According to embodiments, the eBPF program 132 is dissociated from the underlying device input and output operations and operates only with sequential data streams for both consumption and production.

According to some embodiments, to flow control the data streams, the buffer abstraction layer 202 may pause the CS program 132 if no data is available to read by the ingress streaming driver 208 from the data source 204. Similarly, the buffer abstraction layer 202 may pause the CS program 132 if the circular buffer in the egress steaming driver 210 is full awaiting space for new writes to the data destination 206. In further embodiments, the ingress and egress streaming drivers 208, 210 may support circular buffers stored in the CPM 124 that are managed by the drivers based upon read/write operations. As data is read by the buffer abstraction layer 202 and provided to the eBPF program 132, it can be freed in the ingress streaming driver 208 and any associated buffers in the CPM 124. Similarly, as data is written to the data destination 206 by the egress streaming driver 210, the driver frees any associated buffer memory. The buffer abstraction layer 202 thus provides the capability for allowing arbitrarily large memory operations to occur regardless of the size of the CPM 124.

In some embodiments, the buffer abstraction layer 202 works with the ingress streaming driver 208 and the egress streaming driver 210 to initiate data transfers based upon watermarks set in the abstraction layer. For example, a watermark for the ingress streaming driver 208 could set that specifies that additional reads from the FLASH media (data source 204) are to be performed if input data buffered in the CPM 124 falls below 16 KB. Similarly, because it is inefficient to transfer small amounts of data over DMA to the host 108 (data destination 206), a watermark could be set for the egress streaming driver 210 that would only initiate DMA transfers if 4 KB of output data is available to transfer. Once all of the specified input data from the data source 204 has been read from the ingress streaming driver 208 and processed by the eBPF program 132 and any output data flushed to the egress streaming driver 210, the program may be terminated.

The data may be unstructured data (such as arbitrary blocks from the storage media 104) or structured data (such as text-based comma-separated-value data for consumption by an application on the host 108). Further, by abstracting the CS program 132 from the data source 204 and data destination 206, any source or destination may be implemented from/to which the program may consume or produce data. For example, the following table provides some examples of combinations of data source 204 and data destinations 206 for which ingress and egress streaming drivers 208, 210 may be provided in the firmware/hardware of a CSD 120, according to embodiments described herein:

| Source Driver | Destination Driver | Description |
| --- | --- | --- |
| Media | Host Memory (DMA) | Process data from media and stream results to host memory. |
| Media | Media | Process data from media and stream results back to the media. |
| Host Memory (DMA) | Media | Process data from host memory and stream the results into media. |
| CPM | CPM | Process data in the CPM back to the CPM. |
| Media | Peer Device Memory (DMA) | Stream data from a device to another PCIe device (CPM) for processing; aka peer-to-peer streaming. |
| Host Memory (DMA) | Host Memory (DMA) | Process data in host memory and stream the result back to host memory. |

Figure 4:
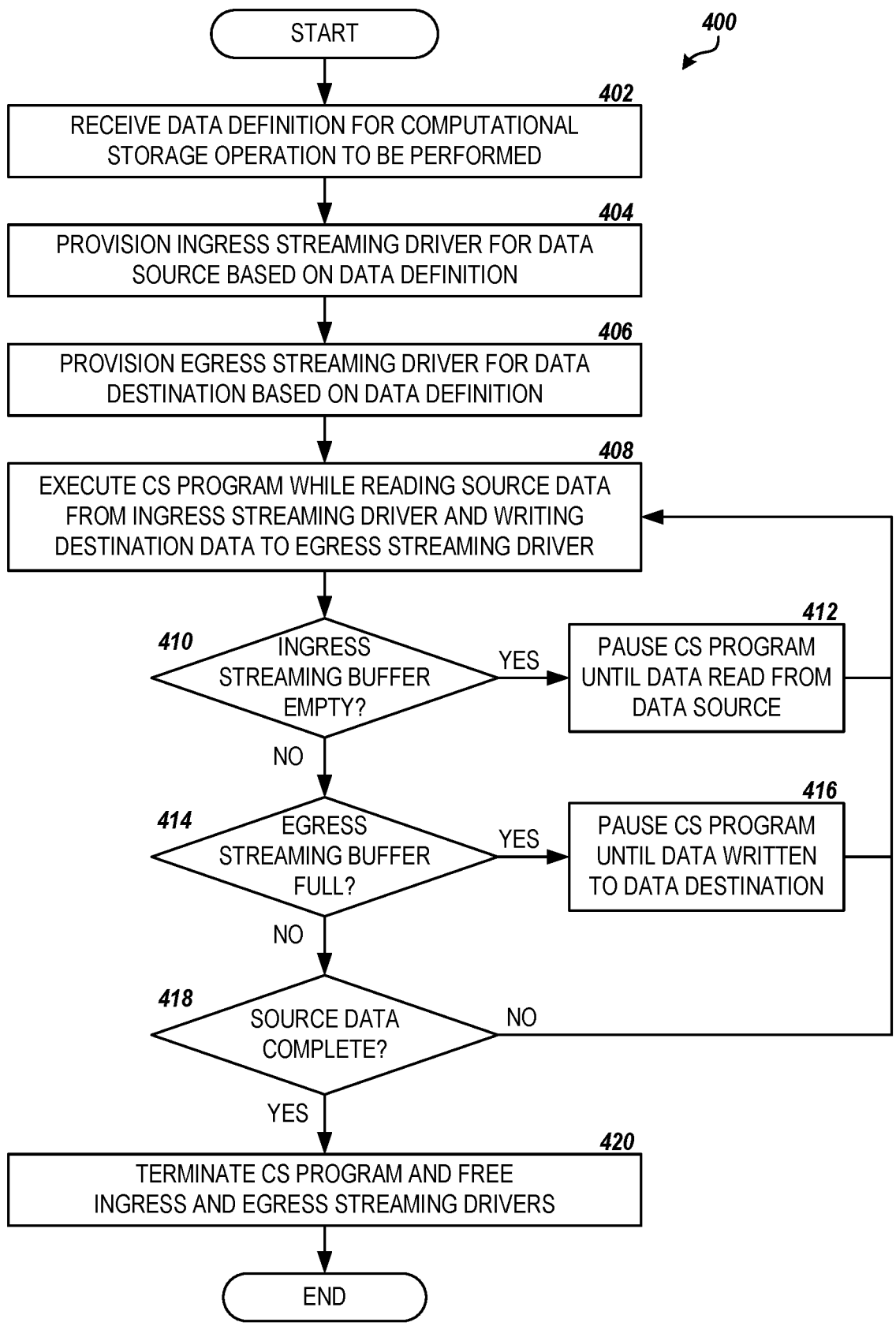
FIG. 4 is a flow diagram showing a routine for streaming data to and from a computational storage program utilizing the computational storage architecture described herein.

FIG. 4 illustrates one routine 400 for streaming data to and from a computational storage program 132 in a computational storage device 120 utilizing the data streaming environment 200 described herein. According to some embodiments, the routine 400 may be performed by the buffer abstraction layer 202 and/or other modules in the firmware of the CSD 120, executing in a controller 106 and/or computational storage processor 122 of the device. In other embodiments, the routine 400 may be performed by firmware and hardware of a storage controller controlling an array of storage devices.

The routine 400 includes step 402, where a data definition is received associated with a computational storage operation to be performed in the CSD 120. For example, the host 108 may request execution of a computational storage program from the controller 106 of the CSD 120. The host 108 may specify a slot number for a CS program 132, a descriptor indicating the data source 204, such as such as FLASH media and a list of LBA ranges, watermarks or buffer thresholds for reading input data from the data source, a descriptor indicating the data destination 206, such as host memory address(es) and lengths/ranges (e.g., a scatter/gather list for DMA transfers), watermarks or buffer thresholds for writing output data to the data destination, and the like. The host 108 may further upload the CS program 132, such as eBPF bytecode, for loading in the specified slot. In other embodiments, the data definition may be predefined for certain computational storage operations in the CSD 120 and stored in the firmware. For example, in a CS-enabled SSD may include a data definition and CS program 120 in the firmware for encryption and/or decryption of data written to and read from the storage media 104 by the host 108 through the controller 106.

Next, the routine 400 proceeds from step 402 to step 404, where an ingress streaming driver is provisioned for the data source 204 based on the data definition received in step 402. For example, the controller 106 may load a streaming driver from the firmware for reading data from the FLASH media 104 of the SSD through the LBA read interface 302, i.e. by accessing data in the FLASH by logical block address. Similarly, at step 406, an egress streaming driver is provisioned for the data destination 206 based on the data definition. For example, the controller 106 may load a streaming driver for writing to host memory through a host DMA engine 304, i.e., by direct memory access over the PCIe bus 306. In addition, the controller 106 may initialize the buffer abstraction layer 202 and/or the circular buffers for buffering of input and output data for the data streams in the CPM 124, as well as establish the watermarks for the reading and writing of data to and from the ingress and egress streaming drivers 208, 210 based on the corresponding descriptors in the received data definition.

From step 406, the routine 400 proceeds to step 408, where the CS program 132 specified by the data definition is executed on the CSP 122 while streaming input data from and output data to the buffer abstraction layer 202. The buffer abstraction layer 202 in turn reads input data from the ingress streaming driver 208 and writes data to the egress streaming driver 210 to manage the data streams. For example, an eBPF program 132 may be loaded into the CS engine 130 and executed to consume data from the FLASH media 104 (data source 204) and produce data to the host 108 (data destination 206) through the buffer abstraction layer 202. According to embodiments, the buffer abstraction layer 202 manages data flow in the data streams from the ingress streaming driver 208 and to the egress streaming driver 210 during execution of the eBPF program 132. As data is consumed by the eBPF program 132, the buffer abstraction layer 202 notifies the ingress streaming driver 208 to read more data from the FLASH media 104 based on the specified watermarks/thresholds for the data source 204. Conversely, when data is produced by the eBPF program 132, the buffer abstraction layer 202 notifies the egress streaming driver 210 to DMA the data to the host 108 based on the specified watermarks/thresholds for the data destination 206. The ingress streaming driver 208 manages the reads from the data source 204, e.g., LBA reads to the FLASH media 104, and the egress streaming driver 210 manages writes to the data destination 206, e.g., DMA writes to the memory of the host 108.

If the buffer abstraction layer 202 determines that there is no data available to be read by the ingress streaming driver 208 from the data source 204, then the execution of the CS program 132 may be paused until more input data is available from the data source 204, as shown at steps 410 and 412 of the routine 400. For example, if the buffer abstraction layer 202 detects that the circular buffer in the CPM 124 for the ingress streaming driver 208 is empty, the buffer abstraction layer can temporarily halt execution of the eBPF program 132 until the ingress streaming driver can read more data from the FLASH media 104. Similarly, if the buffer abstraction layer 202 detects that the circular buffer utilized by the egress steaming driver 210 is full, the buffer abstraction layer can temporarily halt execution of the eBPF program 132 until the egress streaming driver can write more data to the host memory (the data destination 206), as further shown at steps 414 and 416.

As shown at step 418, once all of the source data from the data source 204 specified in the data definition has been read by the ingress streaming driver 208, the routine 400 proceeds to step 420, where the CS program 132 is notified through the buffer abstraction layer 202 to complete its operation. Upon completion of the CS program 132, the controller 106 may then free the ingress and egress streaming drivers 208 and 210 along with any buffer memory and processing resources, and notify the host 108 of completion of the operation. From step 420, the routine 400 ends.

Based on the foregoing, it will be appreciated that technologies for streaming arbitrarily large amounts of data through computational storage programs are presented herein. While the embodiments herein describe CS programs 132 comprising eBPF programs executing in a runtime in the computational storage device 120, other CS program architectures, interfaces, and/or runtime environments may be imagined by one skilled in the art for execution of computational storage functions and programs in a computational storage device. For example, CS programs 132 may comprise ARM code, perhaps translated from eBPF, for execution on ARM-based CSPs 122 and that utilize ARM exceptions to identify when data is exhausted or full in the circular buffers of the streaming drivers 208, 210. It is intended that this disclosure include all such interface and/or runtime environments. Moreover, it will be appreciated that the embodiments described in this disclosure may be utilized in any storage device for the inclusion of computational storage processing in the device. This may include solid-state drives, hybrid magnetic and solid-state drives, magnetic hard disk drives, optical disk drives, USB flash drives, memory cards and cartridges, storage controllers for arrays of flash memory devices, storage controllers for arrays of high-speed magnetic disk drives, and the like.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be appreciated that conditional language, including, but not limited to, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

What is claimed is:

1. A storage device comprising:
   a storage media;
   a computational storage processor; and
   a controller operably coupled to the storage media and the computational storage processor and comprising a firmware, the firmware comprising a plurality of streaming drivers, each of the plurality of streaming drivers associated with a data source or data destination of the storage device, and a buffer abstraction layer operable to read source data from a first streaming driver of the plurality of streaming drivers and provide a source data stream for a computational storage program executing on the computational storage processor and to receive a destination data stream from the computational storage program and write destination data to a second streaming driver of the plurality of streaming drivers, the buffer abstraction layer further operable to pause execution of the computational storage program upon detecting that no data is available for reading by the first streaming driver from the associated data source.

2. The storage device of claim 1, wherein the first streaming driver is an ingress streaming driver associated with the storage media of the storage device.

3. The storage device of claim 1, wherein the second streaming driver is an egress streaming driver associated with a host interface connecting the storage device to a host.

4. The storage device of claim 1, further comprising a computational program memory, wherein the first streaming driver and the second streaming driver are each associated with a circular buffer in the computational program memory.

5. The storage device of claim 4, wherein the buffer abstraction layer is further operable to pause execution of the computational storage program upon detecting that the circular buffer associated with the second streaming driver is full.

6. The storage device of claim 1, wherein the firmware further comprises a runtime for executing computational storage programs comprising Extended Berkley Packet Filter programs on the computational storage processor.

7. The storage device of claim 1, wherein the storage media comprises NAND flash memory.

8. A method comprising steps of:
receiving a definition of a data source, a data destination, and a computational storage program associated with a computational storage operation in a storage device;
provisioning an ingress streaming driver in the storage device for the data source;
provisioning an egress streaming driver in the storage device for the data destination; and
executing the computational storage program in the storage device while reading input data from the ingress streaming driver and writing output data to the egress streaming driver through a buffer abstraction layer, wherein the computational storage program comprises an Extended Berkley Packet Filter program for execution in a compatible runtime on a computational storage processor of the storage device.

9. The method of claim 8, wherein the ingress streaming driver comprises one of a plurality of ingress streaming drivers implemented in the storage device, each of the plurality of ingress streaming drivers associated with one of a plurality of data source/destinations available to the storage device, and wherein the egress streaming driver comprises one of a plurality of egress streaming drivers implemented in the storage device, each of the plurality of egress streaming drivers associated with one of the plurality of data source/destinations.

10. The method of claim 9, wherein the ingress streaming driver is associated with a non-volatile storage media of the storage device and the egress streaming driver is associated with a host interface connecting the storage device to a host.

11. The method of claim 8, wherein the buffer abstraction layer pauses execution of the computational storage program upon detecting that no data is available for reading by the ingress streaming driver from the data source.

12. The method of claim 8, wherein the ingress streaming driver and the egress streaming driver are each associated with a buffer in a computational program memory of the storage device.

13. The method of claim 12, wherein the buffer abstraction layer pauses execution of the computational storage program upon detecting that the buffer associated with the egress streaming driver is full.

14. A non-transitory computer readable medium comprising processor-executable instructions that, when executed by a controller of a storage device, cause the controller to:
provision an ingress streaming driver in the storage device for a data source associated with a computational storage operation associated with the storage device;
provision an egress streaming driver in the storage device for a data destination associated with the computational storage operation;
execute a computational storage program on a computational storage processor of the storage device while reading input data from the ingress streaming driver and writing output data to the egress streaming driver through a buffer abstraction layer; and
pause execution of the computational storage program upon detecting that no data is available for reading by the ingress streaming driver from the data source or that a buffer associated with the egress streaming driver is full.

15. The non-transitory computer readable medium of claim 14, wherein the ingress streaming driver comprises one of a plurality of ingress streaming drivers implemented in the storage device, each of the plurality of ingress streaming drivers associated with one of a storage media of the storage device, a host interface connecting the storage device to a host, and a computational program memory of the storage device, and wherein the egress streaming driver comprises one of a plurality of egress streaming drivers implemented in the storage device, each of the plurality of egress streaming drivers associated with one of the storage media, the host interface, and the computational program memory of the storage device.

16. The non-transitory computer readable medium of claim 15, wherein the computational storage program comprises an Extended Berkley Packet Filter program uploaded to the storage device by the host.

* * * * *